3,266,902
FOAM IMPROVEMENT COMPOSITION IN
MALT BEVERAGES
Mortimer Wilkes Brenner, Scarsdale, N.Y., assignor to
Schwarz Laboratories, Inc., Mount Vernon, N.Y.
No Drawing. Filed Dec. 15, 1961, Ser. No. 159,776
1 Claim. (Cl. 99—48)

The present invention relates to improvements in the properties of foam in carbonated beverages, and in particular to such foam improvements in malt beverages. The term malt beverages includes such products as beer, ale, "near beer," porter, stout, malt liquors, and other such beverages. In the present application the word "beer" shall be used as a generic term to include the entire group of fermented malt beverages.

A fine, creamy stable foam has a definite psychological appeal to the consumer, and is one of the most readily noted criteria for judging beer quality. For greatest esthetic appearance, the foam should be composed of small bubbles, the life of the bubbles should be long, the color of the foam should be a creamy white, and the foam should have good adherance to the glass in which it is poured prior to consumption.

It is generally believed that the requirements for a good beer foam include a relatively low surface tension, a relatively high liquid viscosity, and a suitable concentration of relatively stable surface-active, film forming substances, such as complex proteins, hop resin constituents (isohumulones, etc.), dextrin, melanoidins, and complex carbohydrates. In addition, there should be a freedom from foam-destroying contaminants such as soap, detergents, quaternary-ammonium compounds, long chain alcohols, etc.

It has been demonstrated in a publication by Brenner, McCullay and Laufer (A.S.B.C. Annual Proceedings, pp. 63–82, 1950), that the collapse of foam normally proceeds in two overlapping phases: drainage of liquid beer from the bubble wall is most important in the first interval after the formation of the foam, while collapse of the bubbles by "decay" becomes more important in the interval after the first minute or so of the life of the foam. During this latter phase, bubbles tend to break because of evaporation of the liquid in the bubble wall and because of diffusion of entrapped carbon dioxide through the bubble wall to the outside air.

It has not been generally known what is responsible for the ability of some beer foam to cling to the wall of the beer glass, while other beer foam slides down the glass surface without attaching to the glass so as to leave behind an adherent curtain of foam, which is sometimes termed as "lace" or "lacing of the glass."

It has long been the practice of brewers to attempt to improve the foam of beer by the addition of complex carbohydrates, such as gum arabic or gum acacia, customarily at the rate of between 2 and 15 pounds of the gum per 100 barrels of beer (3100 U.S. gallons). This addition has the effect of increasing the viscosity of the beer with the result that the drainage of liquid from the bubble wall is slow, and accordingly, the foam life is somewhat increased. Experience has shown that the use of these materials may improve the foam quality of some beers, particularly those which are in the low range of foam quality, but that other beers, particularly those which are in the high range of foam quality, do not obtain a noticeable foam improvement by such addition. Other materials have been used for the same purpose such as propylene glycol-alginate, mannan, polyethylene oxide polymers, and the like.

The addition of small amounts of a cobalt salt has been proposed, and gives a variable and small improvement in foam life, but may not help the foam of some beers. In addition, there is the objection that cobalt has been reported by Gray and Stone (Wallerstein Lab. Comm., vol. 24, No. 84, pp. 197–218, August 1961) to induce "gushing" or "wildness."

Accordingly it is an object of the invention to provide a novel additive to improve foam quality in fermented malt beverages.

It is a further object of the invention to provide an additive of the above character which is free from deleterious effects experienced with certain known prior art additives.

It is a further object of the invention to provide a foam additive of the above character which is uniform and predictable in its action.

It is a further object of the invention to provide an additive of the above character which yields a marked improvement in foam characteristics, and which is simple and economical to use.

It is a further object of the invention to provide a foam additive of the above character which does not adversely effect the taste or physical appearance of the beer.

Other objects will appear hereinafter, and still others will be obvious from the following description.

It has been discovered that the addition of minute amounts of zinc and manganese salts to propylene glycol-alginate (the latter being commercially available as "Kelcoloid–O") gives a distinct improvement in foam qualities, and increases the tendency of the foam to "lace" on the glass wall. This result is unexpected since the same metallic ions are ineffective in combination with previous foam additives, as is illustrated by the following examples. Determinations of foam values were made by simplified method for measuring foam collapse rates, as described by Brenner, Siebenberg and Zientara (American Brewer, vol. 91 pp. 42–44, December 1958).

In the following examples, the beers tested were prominent beers sold in the New York metropolitan area.

*Example 1*

A mixture of the following ingredients was prepared: gum arabic—225 grams. $MnSO_4.1H_2O$—4 grams, $ZnSO_4.7H_2O$—2.5 grams. This mixture was added to a beer at the rate of 600 p.p.m. and 1200 p.p.m. with the following results:

| Treatment: | Foam value |
|---|---|
| Control—untreated | 101 |
| 600 p.p.m. added | 93 |
| 1200 p.p.m. added | 99 |

This was typical of the results obtained by adding a mixture of gum arabic with manganese and zinc to the beer, and shows an actual decline in foam value over the untreated beer.

It was particularly surprising then to find that a combination of manganese or zinc ions with propylene glycol-alginate, rather than giving a decrease in foam values as occurred with these metal ions and gum arabic, gave a substantial increase. These benefits were demonstrated not only to improve foam values by the above-noted method for measuring collapse rate of foam, but also by the greatly improved adherence of the foam to the glass, and by the visibly superior resistance of the foam of beer treated with mixtures of propylene glycol-alginate and manganese or zinc ions to the destructive influence of anti-foam agents such as milk fats.

The adherence of foam to the glass was noted by observation and photography and by measuring the distance from the rim of the glass to the level of the first residual "lace" left on the wall of the glass by the subsiding foam during its period of decay or collapse.

The influence of such destructive agents as milk fat was determined by adding a drop or two of diluted whole milk (1:30) to a glass before pouring beer for an observation of foam life.

Zinc and manganese have been found to be effective, non-toxic, and safe for addition to beer. Ions of these two metals did not impair the clarity of the beer on prolonged storage, which included tests involving continuous agitation of the beer for periods of up to four months. In addition, neither of these metal ions, (manganese and zinc) has any noticeable tendency to create gushing or wildness. It has been found that the combination of a concentration of propylene glycol-alginate of between approximately 20 p.p.m. and 200 p.p.m. together with a concentration of either zinc or manganese ion of between 1 and 50 p.p.m. is generally satisfactory, gives very substantial improvement in foam life as measured by the above-noted method for measuring collapse rate of foam, and significantly enhances the cling or adherence of the foam "lace" to glasses. There is also imparted a greatly improved resistance of the foam to anti-foaming agents such as milk fat, lipstick traces, detergents, etc. For special purposes, higher concentrations of up to about 400 p.p.m. of propylene glycol-alginate in combination with up to 100 p.p.m. of manganese ion or zinc ion may be desirable. It is preferred that the foam prolonging and adherence additive be comprised of from 25 percent by weight to approximately 90 percent by weight of propylene glycol alginate with the remainder of the additive mixture being a water-soluble manganous or zinc salt.

The following examples illustrate the results obtained by the use of the new foam additive but are in no way intended to limit the scope of this invention.

*Example 2*

| Treatment | Foam Value | Cling |
|---|---|---|
| Control, No Treatment | 96 | Fair. |
| Gum Arabic, 200 p.p.m | 100 | Fair. |
| Gum Arabic, 200 p.p.m. plus 5 p.p.m. Mn | 88 | Fair. |
| Propylene glycol-alginate 40 p.p.m | 101 | Fair. |
| Propylene glycol-alginate 40 p.p.m., plus 5 p.p.m. Mn | 107 | Excellent. |

As expected, the addition of either gum arabic or propylene glycol-alginate alone yielded an improvement in foam value. The addition of manganese ion to gum arabic resulted in a depression of the foam value, which indicates poorer quality foam. On the other hand, the combination of manganese ion with propylene glycol-alginate gave an unexpected and marked improvement, both in the foam value and in the cling or "lacing" of the foam to the glass.

*Example 3*

A different beer was treated with gum arabic and also with a sufficient amount of zinc sulfate to yield 5 p.p.m. of zinc ion. Other portions were treated with propylene glycol-alginate to the extent of 80 p.p.m. and the same quantity of propylene glycol-alginate plus a sufficient amount of zinc sulfate to add 5 p.p.m. of zinc ion to the beer. The foam test results are shown below:

| Treatment | Foam Value | Cling |
|---|---|---|
| Control, No Treatment | 96 | Satisfactory. |
| Gum Arabic, 400 p.p.m | 103 | Satisfactory. |
| Gum Arabic, 400 p.p.m., plus 5 p.p.m. Zn | 96 | Good. |
| Propylene glycol-alginate 80 p.p.m | 104 | Good. |
| Propylene glycol-alginate 80 p.p.m., plus 5 p.p.m. Zn | 115 | Excellent. |

The results of this experiment indicated the same pattern, that gum arabic and propylene glycol-alginate each gave some improvement in foam quality, the combination of gum arabic with 5 p.p.m. of zinc ion gave no foam improvement, while the combination of propylene glycol-alginate with 5 p.p.m. of zinc ion gave a very substantial benefit.

*Example 4*

A different beer was treated with propylene glycol-alginate to introduce 60 p.p.m. of propylene glycol-alginate while another portion was treated with 60 p.p.m. propylene glycol-alginate and sufficient zinc chloride to add 25 p.p.m. of zinc ion. The test results are as follows:

| Treatment | Foam Value | Cling |
|---|---|---|
| Control, No Treatment | 91 | Fair. |
| Propylene glycol-alginate 60 p.p.m | 98 | Satisfactory. |
| Propylene glycol-alginate 60 p.p.m. plus 25 p.p.m. zinc ion | 105 | Excellent. |

*Example 5*

In still another experiment, a different beer was treated as shown below, with the following results:

| Treatment | Foam Value | Cling |
|---|---|---|
| Control, No Treatment | 90 | Satisfactory. |
| Propylene glycol-alginate 120 p.p.m | 104 | Good. |
| Propylene glycol-alginate 120 p.p.m., manganese ion 45 p.p.m | 114 | Excellent. |

To give an indication of the foam quality achieved with the present additives, the prominent beers sold in the New York metropolitan area when untreated give a foam value as measured by the above method which range from a low of 85 to a high of 103. In this context, it may readily be seen that the addition of minute amounts of zinc or manganese to propylene glycol-alginate provides a foam additive which is particularly effective in small concentrations, and which will readily improve the quality of the beer foam from mediocre to outstanding. The manganese and zinc ions are substantially free from adverse effects on beer, contrary to the results which would be expected when these metal ions are combined with additives such as gum arabic. The manganese ion is tasteless at concentrations in excess of 50 p.p.m. while the zinc ion is tasteless at least in concentrations as high as approximately 20 to 25 p.p.m.

While the foam additive may be added to the beer at any stage before the bottling process, it is preferably added immediately before the final filtration step, since the marked improvement in foaming resulting from the additive might be disadvantageous earlier during the brewing process, as well as wasteful of the additive materials.

Throughout the specification and claims, all references to parts, or percentages, etc., refer to parts by weight where otherwise unspecified.

Accordingly, it may be seen from the above disclosure that there has been provided a foam additive which markedly improves foam quality and the ability of the foam to "lace" to the glass. The foam additive greatly increases the resistance of the foam to anti-foam agents, and the improvement in foam properties is achieved without any induced tendency toward gushing or wildness. The present foam additive is remarkably uniform and predictable in its effects on beer, and is substantially free of undesirable side effects.

Accordingly it may be seen that the objects of the invention, including those made apparent from the preceeding description, are efficiently obtained and that there has been disclosed a novel and useful foam additive of particular utility in the brewing art.

I claim:

A foam prolonging and foam adherence promoting composition of matter as an additive to fermented malt beverages comprising as its active ingredients from 25 percent by weight to approximately 90 percent by weight of propylene glycol alginate and the remainder a water-soluble manganous salt.

References Cited by the Examiner

UNITED STATES PATENTS 2,559,612   7/1951   Geller _____ 99—48

OTHER REFERENCES

Bloom, Wochenschrift fur Brauerei, Jan. 25, 1936, pp. 25 to 29.

Journal of the Institute of Brewing, vol. 60, 1954, page 71.

Journal of the Institute of Brewing, vol. 67, 1961, page 13.

A. LOUIS MONACELL, *Primary Examiner.*

TOBIAS E. LEVOW, ABRAHAM H. WINKELSTEIN, RAYMOND N. JONES, *Examiners.*

M. W. GREENSTEIN, *Assistant Examiner.*